United States Patent [19]

Brown, Jr. et al.

[11] Patent Number: 5,028,853
[45] Date of Patent: Jul. 2, 1991

[54] SWITCH ACTUATION CIRCUIT AND ARRANGEMENT

[75] Inventors: Robert J. Brown, Jr., Boca Raton, Fla.; Bahattin Erturk, Rollingmeadows, Ill.

[73] Assignee: Square D Company, Palatine, Ill.

[21] Appl. No.: 299,778

[22] Filed: Jan. 23, 1989

[51] Int. Cl.$^5$ ............................................. H02P 3/00
[52] U.S. Cl. ................................... 318/280; 318/266; 318/283
[58] Field of Search ................................ 318/200–206, 318/466, 467, 256, 264–267, 16, 469, 452, 454

[56] References Cited

U.S. PATENT DOCUMENTS

| | | | |
|---|---|---|---|
| 2,171,267 | 8/1939 | Doty | 200/106 |
| 2,560,465 | 7/1951 | McVicker et al. | 74/625 |
| 2,864,911 | 12/1958 | Brumfield | 200/92 |
| 3,199,857 | 8/1965 | Klamp | 318/266 |
| 3,366,855 | 1/1968 | Huber et al. | 318/16 |
| 3,539,894 | 11/1970 | Feldman | 318/469 X |
| 3,584,166 | 6/1971 | Halicho | 200/38 |
| 3,737,604 | 6/1973 | Dietrich et al. | 200/153 LB |
| 4,035,702 | 7/1977 | Pettersen et al. | 318/283 X |
| 4,142,137 | 2/1979 | Umpleby et al. | 318/253 |
| 4,433,274 | 2/1984 | Duhame | 318/283 |
| 4,455,517 | 6/1984 | Mitchell | 318/283 |
| 4,476,416 | 10/1984 | Licata et al. | 318/283 |
| 4,563,625 | 1/1986 | Kornbrebbe et al. | 318/283 X |
| 4,644,235 | 2/1987 | Ohta | 318/280 X |
| 4,689,533 | 8/1987 | Yang | 318/283 X |
| 4,736,144 | 4/1988 | Chun-Pu | 318/283 X |

Primary Examiner—William M. Shoop, Jr.
Assistant Examiner—A. Jonathan Wysocki
Attorney, Agent, or Firm—Larry I. Golden; Jose W. Jimenez; A. Sidney Johnston

[57] ABSTRACT

A motor and manual actuated switch includes a motor control circuit for controlling the motor to rotate in either a clockwise or counterclockwise direction to actuate a mechanical switch between the open circuit and short circuit states. The control circuit includes a capacitor coupled in series with the motor winding to form a series circuit and a control switch for connecting a source of d.c. power across said serial circuit when in a first position and a short circuit across said series circuit when in a second position. When the control switch is moved to the first position, the capacitor charges, causing a current to flow through the motor winding during the charge time, thereby causing rotation in one direction. When the control switch is moved to the second position, the capacitor discharges through the winding, thereby causing opposite current flow and shaft rotation. The mechanical switch may be made to change states by actuation of a manual button or by rotation of the motor and includes a pin which rotates upon a change of states of the mechanical switch. The motor is interconnected with the pin by an extension and offset extending from the pin and an open center triangular shaped connector affixed to the motor shaft, with the offset extending into the open center. The extension acts as a spring to reduce the impact of the connector against the offset when the motor shaft rotates.

15 Claims, 1 Drawing Sheet

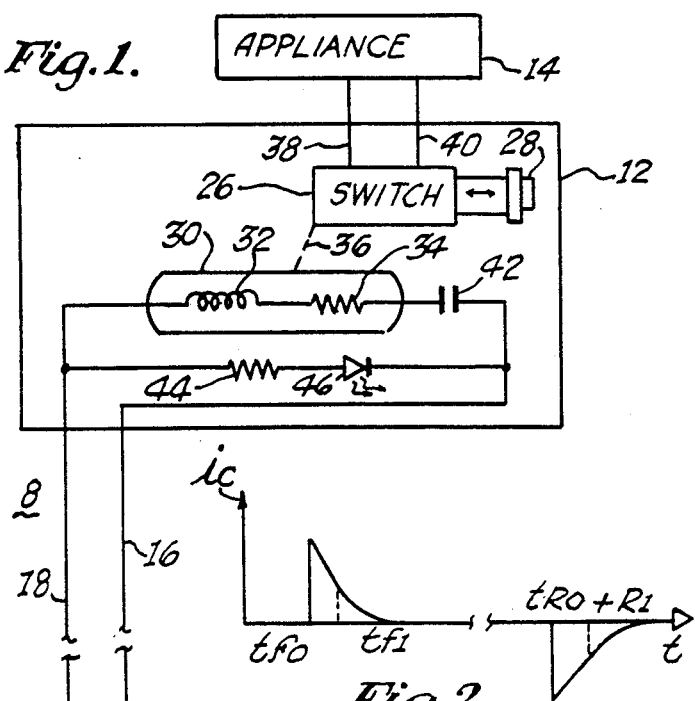
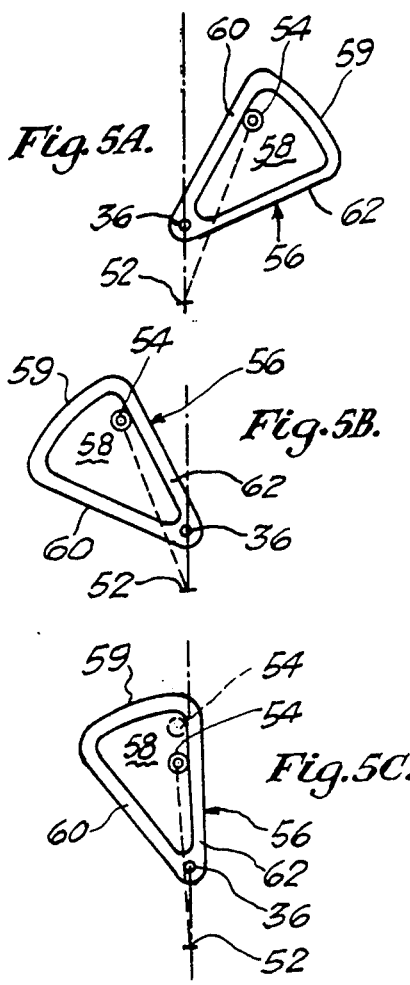
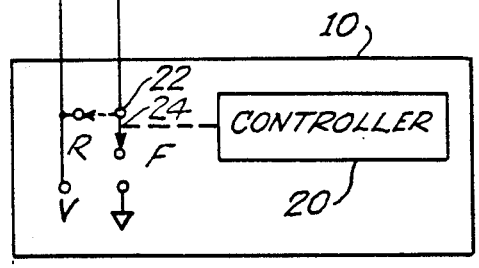
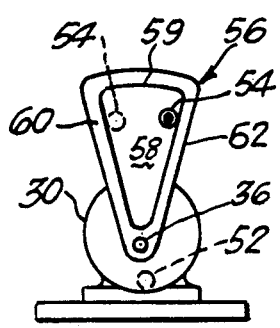
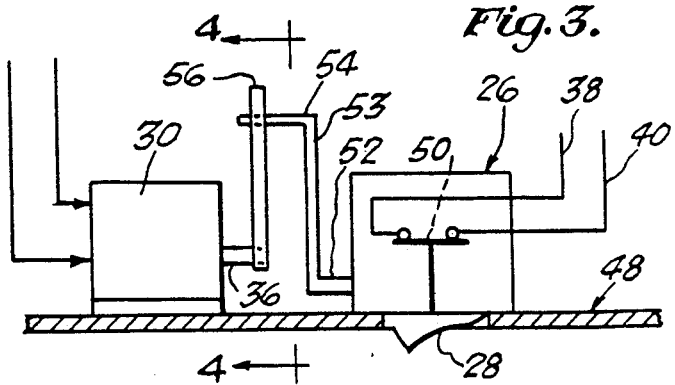

SWITCH ACTUATION CIRCUIT AND ARRANGEMENT

This invention relates to a motor control circuit, and more particularly, to such a circuit for controlling a motor to rotate in one of either a clockwise or counterclockwise direction in response to the change of state of an associated switch, where the switch is coupled to the motor over only two lines.

The subject application is being filed in conjunction with motor controlled Switch Mechanism, U.S. patent application Ser. No. 07/299,775.

At the present time, there is little energy management control or automation control of various energy consuming devices found in a typical facility, such as a home or business. For example, in the home, an energy consuming appliance, such as a light bulb or an air conditioner, is permitted to continuously consume energy and function based on settings solely made by the occupant of that facility. In other words, a light bulb is only illuminated whenever the switch controlling the light bulb is set in the on position by the occupant.

With modern technology, many improvements have been made to permit automatic energy management or appliance control independent of the intervention of the occupant of the facility. For example, references made to Published PCT Patent Number PCT/US 87/02365, entitled "Energy Management System" listing Robert J. Brown III, et al as inventors, which publication describes a technique for managing the consumption of energy by consuming applicances based on preset schedules and the transmission of signals in accordance with those schedules. The user merely selects a particular schedule number and the signals cause the appliance to turn on or turn off with the accordance of the dictates of the selected schedule.

Other systems are also commonly used to turn on or turn off lights, for example, at specific times to give the appearance that the occupant of the facility is present despite the occupant's absence. Such a control may be accomplished using sophisticated computer systems or simply utilizing electromechanical time clocks which turn on or turn off the lights at selected times. One type of centralized facility automation system is described in U.S. patent application, Ser. No. 07/257,076, filed Oct. 13, 1988 in the name of Robert J. Brown, Jr. et al and entitled "Power Management And Automation System" and assigned to the assignee hereof. In this application, signals are provided from a central location to various other parts of the facility to automatically turn on or off various appliances, such as lights.

In order to control an appliance through the use of a centralized automation system, a motorized switching mechanism of some type is typically utilized. When the motor receives the signals from the central controller, it actuates a switch to turn on or turn off the appliance being controlled in a manner similar to how a person would manually actuate a switch. Typically, the motorized switching mechanism includes both a mechanical switch and a motor or solenoid which actuates the mechanical switch from one state to the other state in response to signals from the remote facility controller. In order to provide the user with maximum flexibility, the motorized switch may also include a conventional, manually actuated mechanism, for permitting the user to override the state of operation set by the remote facility controller. Examples of such motorized switches are shown in U.S. Pat. Nos. 2,171,267 in the name of Doty entitled "Electric Switch", 2,864,911 in the name of Brumfield entitled "Mechanism For Motor Operation Of A Circuit Breaker", 2,560,465 in the name of McVicker et al entitled "Hand Or Power Operated Mechanism", 3,584,166 in the name of Halicho entitled "Clock-Operated Switch Timing Device With Improved Manual Operating Means" and 3,737,604 in the name of Dietrich entitled "Single Switch With Multiple Transverse Actuators". One common problem with each of the above examples of the prior art is the complexity of the mechanisms utilized to permit both manual and motor controlled actuation of the switching mechanism.

When utilizing a motor to actuate the switch, the motor must be capable of operating in two directions in order that the switch can be turned either on or off. A d.c. motor is particularly useful for this type of operation since the direction of the current through the winding determines the direction of rotation of the motor shaft. Control circuits for such a motor, particularly those circuits controlling the motor from a remote location, typically require three or more wire leads from the remote controller to the motor. Because most facilities already include two lead wiring throughout, such as preinstalled telephone wiring, the requirement of three or more lead wiring requires new wires to be added to the facility to be automated. In addition, the motor should draw a minimum amount of current, particularly during the vast majority of the time when it is inoperative.

Examples of motor control circuits of the prior art include U.S. Pat. Nos. 3,361,948 in the name of Sawyer entitled "Electromechanical Bi-Directional Motion Actuator Device", 3,268,786 in the name of Reich entitled "Electric Razor" and 2,587,123 in the name of Dunning et al entitled "Film Advance Mechanism in Slide Film Dispenser".

In accordance with one aspect of this invention, there is provided a motor control circuit for controlling a motor to rotate in a first or second direction by an amount sufficient to trip a mechanical switch. The motor has a winding and the direction of current through the winding determines the direction which the motor rotates. The circuit comprises a source of power having a power terminal and a common terminal and switch means having a pair of input terminals and an output terminal. The switch means is controllable to couple a selected one of the input terminals to the output terminal and the input terminals are respectively coupled to the power and common terminals of the source of power. In addition, the circuit includes capacitor means coupled in series with the motor to form a series circuit, first means for coupling the power terminals to one side of the series circuit and second means for coupling the switch means output to the other side of the series circuit.

One preferred embodiment of the subject invention is hereafter disclosed, with specific reference being made to the following Figures, in which:

FIG. 1 is a diagram, partially in schematic and partially in block, of the switch of the subject invention and the motor control circuit therefore;

FIG. 2 is a timing diagram of the current flow $i_c$ flowing in the motor control circuit, shown in FIG. 1;

FIG. 3 is a side view of the motor and switching mechanism of the subject invention and the interconnection therebetween;

FIG. 4 is a view taken across lines 4—4 of FIG. 3; and

FIGS. 5A, 5B and 5C show the connector and pin positions for different positions of the switch mechanism.

Referring to FIG. 1, a diagram, partially in schematic and partially in block form, shows the main structural features of the controllable switch system 8 of the subject invention. System 8 includes a central module 10 which provides signals to a switch module 12 for controlling an appliance 14. Appliance 14 may be a simple room light or may be a common household small appliance, such as a coffee maker, or appliance 14 may be a more sophisticated system, such as a security system controlling the security of the facility. The signals from central module 10 to switch module 12 are provided over a pair of leads 16 and 18, which may be any conventional wire leads, such as the excess wires in telephone prewiring or the like. Typically, central module 10 will be located in an area remote from the area in which switch module 12 and appliance 14 are located. For example, central module 10 may be located in the garage of a home near the circuit breaker box and may include a plurality of different modules, such as described in the aforementioned U.S. patent application Ser. No. 07/257,076.

Central module 10 includes a controller 20 and a switch 22. While switch 22 is schematically shown separate from controller 20 in FIG. 1, it typically will be a solid state switching device included with controller 20 as the output driver circuit of module 10. Controller 20 controls switch 22 so that the switch arm 24 thereof may be positioned to be in contact with either a forward (F) terminal or a reverse (R) terminal. Controller 20 sends signals to move switch arm 24 to cause it to move between one of the forward (F) or reverse (R) terminals. The forward (F) terminal of switch 22 is coupled to a point of reference potential, which typically is ground potential. The reverse (R) terminal of switch 22 is coupled to the nonreference potential, which is indicated as +V in module 10. Thus, when switch arm 24 is positioned against the forward (F) terminal, the output from switch 22 is at ground potential and when switch arm 24 is positioned against the reverse (R) terminal, the output from switch arm 24 is +V voltage. As seen from FIG. 1, lead 16 is connected to the output of switch arm 24 and lead 18 is connected to the point of +V potential.

Switch module 12 includes controllable switch 26 which, in turn, includes a manual switch button 28 capable of assuming two different positions, as indicated by the arrow associated therewith. Switch 26, in addition, is controlled by d.c. motor 30, which includes a winding 32 and associated winding resistance 34. Depending upon the direction of the current $i_c$ flowing through winding 32, motor shaft 36 rotates in either the clockwise or counterclockwise direction. Rotation of shaft 36, in turn, causes the mechanisms within switch 26 to create an open or short circuit across the output terminals 38 and 40 of switch 26. Switch button 28 may also be manually actuated by the user to effect whether output terminals 38 and 40 are in an open circuit or short circuit state. Appliance 14, in turn, is coupled to output terminals 38 and 40 and receives power when terminals 38 and 40 are in a short circuit state and does not receive power when terminals 38 and 40 are in an open circuit state.

Thus, the state of switch 26 is controlled by two separate controlling mechanisms, that is motor 30 and button 28. Each can be operated independently to change the state of switch 26 from one to another position, if the switch is not already in the other position. For example, if motor 30 had caused switch 26 to short circuit terminals 38 and 40 and button 28 was depressed to short circuit terminals 38 and 40, nothing would happen because the terminals 38 and 40 had already been short circuited. On the other hand, if button 28 were depressed to open circuit terminals 38 and 40, the command from motor 30 previously given would be overridden.

The motor control circuit of system 8 includes a capacitor 42 connected in serial with motor 30. One end of the serial circuit, for example the remote side of motor 30, is coupled to the +V voltage line on line 18 and the other end of the serial circuit, for example the remote side of capacitor 42, is coupled through lead 16 to the output of switch arm 24 in central module 10. A resistor 44 serially coupled with the anode-cathode path of a light emitting diode 46 is coupled in parallel with the serial circuit formed by motor 30 and capacitor 42 to provide an indication of the status of the last movement of motor 30. Diode 46 is poled from line 16 to line 18.

In operation, the motor control circuit shown in FIG. 1 causes a rotation of shaft 36 each time switch arm 24 is moved from one of the forward (F) or reverse (R) terminals to the other one of the forward (F) or reverse (R) terminals. More specifically, if the switch arm 24 is moved from the forward (F) terminal to the reverse (R) terminal, a reverse, or counterclockwise, rotation of shaft 36 occurs. On the other hand, if switch arm 24 is moved from the reverse (R) to the forward (F) terminal, a forward, or clockwise, rotation of shaft 36 occurs. The duration of the driving current $i_c$ for shaft 36 is selected to be sufficient to trip the mechanisms within switch 26 and may be approximately one third of a revolution. After the driving current $i_c$ ceases driving shaft 36, it is allowed to freely rotate with external frictions and mechanical blockages being used to break the rotation.

The specific circuitry shown in FIG. 1 permits both the forward and reverse rotation of shaft 36 to be accomplished with only the two leads 16 and 18 connecting modules 10 and 12. More specifically, when switch arm 24 is switched from the reverse (R) to the forward (F) terminal, drive current $i_c$ flows from the +V terminal of the power source through lead 18, winding 32 and winding resistance 34, through capacitor 42 and back through winding 16 and the switch arm 24 to ground. The current $i_c$ causes capacitor 42 to become charged to +V volts during a time based on the resistance 34 and capacitor 42 time constant. During the time period it takes to charge capacitor 42 to +V volts, current $i_c$ flows through winding 32 and causes forward, or clockwise rotation of shaft 36. The rotation time, and hence rotation amount, of shaft 42, is thus determined by the component values of capacitor 42 and winding resistance 34, as well as the voltage value of voltage +V and these values can be selected to achieve the appropriate amount of shaft 36 rotation. The exact duration of forward rotation is illustrated in FIG. 2 as being between times $t_{F0}$ and $t_{F1}$ for the first pulse of current $i_c$.

Once capacitor 42 is fully charged to V volts, current $i_c$ drops to an effective zero amount. It should be noted; however, that a small trickle of current $i_c$ will continue to flow in order to maintain the +V charge on capacitor 42, but this trickle of current is insufficient to cause any rotation of shaft 36. Because there may be many switches similar to switch module 12 in the system 8, it is important to utilize a minimum amount of current $i_c$ during the times between the rotation of shaft 36 and the motor control circuit described above accomplishes this result.

When it is desired for shaft 36 to rotate in the reverse direction, and reset switch 26, switch arm 24 is moved from the forward (F) terminal to the reverse (R) terminal. This state of switch 22 connects the same voltage (+V) to both leads 16 and 18 and provides a discharge path for the voltage stored in capacitor 42 through winding resistance 34. Again, a similar short pulse of current $i_c$ occurs during the discharge time and is sufficient to drive shaft 36 approximately one third of a revolution in the opposite direction during the time between times $t_{R0}$ and $t_{R1}$ shown in FIG. 2. This opposite direction rotation of shaft 36 is sufficient to change the state of switch 26.

Whenever switch arm 24 has been moved to the forward (F) terminal, current also flows through resistor 44 and the anode to cathode path of light emitting diode 46 to cause light emitting diode 46 to glow, thereby indicating that the last occurring rotation of shaft 36 was forward, or in other words, switch 26 had been set. On the other hand, when switch arm 24 is moved to the reverse (R) terminal, no current can flow through resistor 44 and diode 46 and, hence, a lack of a glow of diode 46 indicates that a reverse movement of shaft 36 last occurred, or in other words, that switch 26 has been reset.

Referring now to FIGS. 3 and 4, the mechanical connection between motor 30 and controllable switch 26 is shown. Where appropriate, like numerical designations are used for like components. Motor 30 and switch 26 are mounted on a switch plate 48, which may be the same size as a conventional switch plate used to cover a switch controlling, for example, the lights in a room. Manual switch button 28 extends through an opening in switch plate 48 and may be a conventional switch rocker arm, as shown in FIG. 3. Within switch 26, a mechanical relay 50, which is actuated by operation of either shaft 36 of motor 30 or depression of button 28, is schematically shown in the closed circuit position by the solid lines and in the open position by the dashed lines.

Extending from switch 26, is a rotating pin 52, which has an extension 53 and offset 54 extending therefrom. As will be discussed in more detail hereafter, extension 53 is designed to have a slight amount of spring therein. Pin 52 is mechanically linked to mechanical relay 50 and rotates between a first rotary position and a second rotary position, depending on the state of mechanical relay 50. For example, when mechanical relay 50 is in the closed, on or short circuit position, as shown in FIG. 3 by the solid lines, pin 52 is rotated in the counterclockwise direction and when mechanical relay 50 is in the open, off or open circuit position, as shown by the dashed lines in FIG. 3, pin 52 has been rotated in the clockwise direction. As pin 52 rotates, offset 54 in turn travels over an arc determined by the amount of rotation.

A connector 56 is used to interface between offset 54 and shaft 36 to permit the dual control of switch 26. Connector 56 is shaped generally as a triangular element with an open center 58. One corner of connector 56 is affixed to shaft 36 and the side 59 opposite to that one corner is arc shaped with a radius approximately equal to the radius from shaft 36. The other two sides of connector 56 extend slightly beyond the end of extension 53 from which offset 54 extends so that offset 54 extends into open center 58 slightly below the inner edge of side 59. Whenever motor shaft 36 is driven in a rotational direction by one of the pulses seen in FIG. 2, connector 56 correspondingly moves and the inner edge of the trailing side 60 or 62 moves offset 54. During the time that minimal current $i_c$ is flowing in the motor control circuit, shown in FIG. 1, connector 56 only moves when forced to a different position by the manually actuated rotation of offset 54.

Referring now to FIGS. 5A through 5C, the cooperation of connector 56 and offset 54 will be described. In discussing FIGS. 5A through 5C, it should be understood that there are three different conditions which can occur and these are that the switch can be off, on or in transition between off and on. FIGS. 5A and 5B illustrate the respective off and on positions of offset 54 and connector 56 and FIG. 5C illustrates the positions of offset 54 and connector 56 during a transition.

Referring first to FIG. 5A, where switch 26 is shown in the off position, that is mechanically relay 50 is an open circuit, as indicated by the dashed lines in FIG. 3. The off position is indicated by offset 54 being to the right of the vertical from shaft 36 and pin 52. This occurs as a result of either the depression of button 28 to the off state or the action of motor 30 rotating connector 56 to the right.

When button 28 is depressed to turn switch 26 to the off position from the on position, as shown in FIG. 5B, offset 54 moves towards the right and against the inner edge of side 62 of connector 56, thereby driving connector 56 to the right. To the extent shaft 36 is freely rotatable, connector 56 will continue rotating to the right until stopped by edge 60 contacting offset 54. However, connector may stop short of the position shown in FIG. 5A as a result of internal breaking of shaft 36 due to for instance the forces from the internal magnets within motor 30.

When motor 30 is commanded, by appropriate signals over lines 16 and 18, to move offset 54, and hence switch 26, to off position, connector 56 is moved from the position shown in FIG. 5B to the position shown in FIG. 5A. During this movement, the inner edge of side 60 of connector 56 contacts and moves offset 54 to the right position shown in FIG. 5A. In order to permit the desired movement of offset 54, the distance between offset 54 and the opposite inner edge of side 60 is required to permit motor shaft 36 to gain sufficient speed to move offset 54. This speed, in conjunction with the mass of side 60 creates sufficient force to overcome the spring tension from the mechanism associated with relay 50. The spring action associated with extension 53 limits the sudden force imparted by connector 56 against offset 54 from reaching the internal mechanisms associated with relay 50.

When it is desired to move offset 54 from the off position, shown in FIG. 5A, to the on position, shown in FIG. 5B, actions exactly opposite to those described above occur.

Referring to FIG. 5C, during the movement of offset 54 and connector 56 from either position to the other position, offset 54 slides down against the contacting side 60 or 62 of connector 56. This is due to the fact that the radial center for offset 54 is closer to plate 48 than is the radial center of connector 56. The open center 58 of connector 56 permits relative movement of offset 54 down against the inner edge of the driving side 60 or 62. The maximum relative downward movement is shown in FIG. 5C, which also shows the end position of offset 54 in dashed lines. Thus, open center 58 must be sized to at least accommodate this relative downward movement.

By using the combination of connector 56 and the offset 54, as illustrated in FIGS. 5A through 5C, it is seen that the switch can be manually turned from one to the other positions without appreciably moving the connector 62. In other words connector 62 is only moved in response to signals controlling motor 30 and not in response to the actuation of button 28. This is desirable to avoid wear and tear on motor 30, as well as to avoid inducing spurious signals through rotation of shaft 36.

What is claimed is:

1. A facility automation system comprising:
   a motor having a shaft;
   mechanical switch means;
   a central system which controls the operation of a remote device through the actuation of said mechanical switch means, said mechanical switch means being actuated mechanically in response to the rotation of the motor shaft in one of two directions, the motor operating in response to a control signal provided from said central system;
   an arrangement, for coupling said central system to said motor using two leads, including
   control means, within said central system, for coupling one of either a first voltage or a second, different from said first, voltage to one of said two leads as said control signal, said other lead having said second voltage coupled thereto;
   capacitor means coupled to form a serial circuit with said motor; and
   means for coupling said one lead to one side of said several circuit and for coupling said other lead to the other side of said serial circuit.

2. The invention according to claim 1 further including signaling means coupled in parallel with said serial circuit to provide an indication whenever said control means couples said first voltage to said one lead.

3. The invention according to claim 2 wherein said first voltage is a reference voltage and said second voltage is a nonreference voltage.

4. The invention according to claim 3 wherein said signal means includes a light emitting diode poled from said other lead to said one lead.

5. The invention according to claim 3 wherein said signal means includes a light emitting diode in series with a resistor, said diode being poled from said other lead to said one lead.

6. The invention according to claim 1 wherein said first voltage is a reference voltage and said second voltage is a nonreference voltage.

7. A switch actuation circuit and arrangement, comprising:
   a mechanical switch having a means for moving between a first position and a second position for engaging the mechanical switch;
   a motor including a winding for passing current therethrough to operate the motor and including a motor shaft for rotating in a direction which corresponds to the direction of the current passing through the winding;
   means coupled to and responsive to the motor shaft, for moving said means between the first and second positions;
   a control circuit for controlling the motor including:
   a source of power having a power terminal and a common terminal;
   switch means having a pair of input terminals and an output terminal, said switch means being controllable to couple a selected one of said input terminals to said output terminal, said input terminals being respectively coupled to said power and common terminals of said source of power;
   capacitor means coupled in series with said motor to form a series circuit;
   first means for coupling said power terminal to one side of said series circuit; and
   second means for coupling said switch means output to the other side of said series circuit;
   whereby the motor responds to the control circuit by causing the motor shaft to move said means to engage the mechanical switch.

8. The invention according to claim 7:
   wherein said switch means is in a first state when said first input terminal is coupled to said output terminal and in a second state when said second input terminal is coupled to said output terminal; and
   wherein said circuit further includes signaling means coupled between said first and second coupling means for signaling the state of switch means.

9. The invention according to claim 8 wherein said signaling means includes a light emitting diode.

10. The invention according to claim 7 wherein said motor control circuit further includes signaling means coupled between said first and second coupling means for signaling the state of switch means.

11. The invention according to claim 10 wherein said signaling means includes a light emitting diode.

12. The invention according to claim 11 wherein said light emitting diode is poled to emit light when said common terminal is coupled to said switch means output terminal.

13. The invention according to claim 7 wherein the amount of rotation of said shaft is determined by an RC time constant accociated with said capacitor means and said winding.

14. The invention according to claim 7 wherein said shaft is driven in one direction for a time determined by the charge time of said capacitor means when said switch means is controlled to couple said common terminal to said output terminal.

15. The invention according to claim 14 wherein said shaft is driven in other direction for a time determined by the discharge time of said capacitor means when said switch means is controlled to couple said power terminal to said output terminal.

* * * * *